(12) United States Patent
Zhang (10) Patent No.: US 10,759,532 B2
(45) Date of Patent: Sep. 1, 2020

(54) DRONE CAPTURE AERIAL VEHICLES AND METHODS OF USING THE SAME

(71) Applicant: Hanhui Zhang, Clarksburg, MD (US)

(72) Inventor: Hanhui Zhang, Clarksburg, MD (US)

( * ) Notice: Subject to any disclaimer, the term of this patent is extended or adjusted under 35 U.S.C. 154(b) by 406 days.

(21) Appl. No.: 15/851,672

(22) Filed: Dec. 21, 2017

(65) Prior Publication Data

US 2019/0112045 A1    Apr. 18, 2019

Related U.S. Application Data

(60) Provisional application No. 62/574,170, filed on Oct. 18, 2017.

(51) Int. Cl.
*B64C 39/02* (2006.01)

(52) U.S. Cl.
CPC ...... *B64C 39/024* (2013.01); *B64C 2201/021* (2013.01); *B64C 2201/024* (2013.01); *B64C 2201/027* (2013.01); *B64C 2201/104* (2013.01); *B64C 2201/108* (2013.01); *B64C 2201/12* (2013.01); *B64C 2201/182* (2013.01)

(58) Field of Classification Search
CPC ............ B64C 39/024; B64C 2201/12; B64C 2201/182; B64C 2201/027; B64C 2201/104; B64C 2201/021; B64C 2201/108; B64C 2201/024
See application file for complete search history.

(56) References Cited

U.S. PATENT DOCUMENTS

| | | | | |
|---|---|---|---|---|
| 2,722,075 | A | * | 11/1955 | Abrassart .............. F42B 12/362 43/1 |
| 2,848,834 | A | * | 8/1958 | Cox ...................... F42B 12/362 43/1 |
| 10,113,839 | B2 | * | 10/2018 | Sekiya .................... F41H 11/02 |
| 10,427,790 | B2 | * | 10/2019 | Verkade ................... B64D 9/00 |
| 10,435,153 | B2 | * | 10/2019 | Klein ....................... B64D 1/02 |
| 10,458,757 | B1 | * | 10/2019 | Kearney-Fischer ........ B64C 39/024 |
| 2016/0137293 | A1 | * | 5/2016 | Santangelo ........... B64C 39/024 244/50 |
| 2016/0376029 | A1 | * | 12/2016 | Sekiya .................... F41H 11/02 244/110 F |
| 2017/0144756 | A1 | * | 5/2017 | Rastgaar Aagaah ........ B64C 39/024 |
| 2017/0253348 | A1 | * | 9/2017 | Ashdown ................. B64F 1/02 |
| 2017/0355461 | A1 | * | 12/2017 | Naito ...................... F41H 11/04 |
| 2017/0356726 | A1 | * | 12/2017 | Theiss ................. F41H 13/0006 |

* cited by examiner

*Primary Examiner* — Valentina Xavier
(74) *Attorney, Agent, or Firm* — SZDC Law P.C.

(57) ABSTRACT

A drone capture aerial vehicle includes a fuselage and a drone capture device. The drone capture device includes a middle post and a plurality of foldable frame arms; the middle post includes a first end and a second end; and each foldable frame arm includes a plurality of ribs and a plurality of links. A method of capturing a drone includes providing a drone capture aerial vehicle, the drone capture aerial vehicle having a drone capture device and the drone capture device having a foldable capture net; flying the drone capture aerial vehicle toward the drone; activating the drone capture device to deploy the foldable capture net; and capturing the drone with the capture net.

19 Claims, 12 Drawing Sheets

DRONE CAPTURE AERIAL VEHICLES AND METHODS OF USING THE SAME

This application claims priority to U.S. Provisional Patent Application No. 62/574,170, filed on Oct. 18, 2017, which is incorporated by reference for all purposes as if fully set forth herein.

BACKGROUND OF THE INVENTION

Field of the Invention

The present invention relates to drone capture aerial vehicles that capture illegal or threatening drones in the air and methods of using the drone capture aerial vehicles.

Discussion of the Related Art

The popularity of the drones poses serious security issues. For example, the appearance of illegal drones in restricted area, such as an airport, can cause serious chaos and the illegal drones need to be neutralized as soon as possible.

To tackle this issue, some counter-drone systems are developed. Capturing nets are fired from the ground to entangle and disable the targeted drones. The results are usually not optimized given the range limits. In some other applications, unmanned aerial vehicles (UAV) carry the counter-drone nets in the air to capture the targeted drones. In this case, because of the size of the nets and the aerodynamic drag created by the nets, large UAV systems usually are needed for effective operation.

A drone capture aerial vehicle with a compact, foldable drone capturing net deploying device is needed to efficiently capture illegal or threatening drones in the air.

SUMMARY OF THE INVENTION

A compact drone capture aerial vehicle is presented in the current invention. With a multi-folded frame assembly and a flexible capturing net attached to the frame assembly. The capturing net can be folded into the fuselage of the hosting counter-drone UAV to reduce the aerodynamic drag before the capturing starts. The capturing device unfolds the frame assembly and expends the capturing net to cover largest intercepting area during the capturing. The counter-drone UAV flies towards the targeted drone and entangled the target drone with its capturing net. The targeted drone is then transported to the safe location afterward.

In one embodiment, the present invention provides a drone capture aerial vehicle that includes a fuselage and a drone capture device. The drone capture device includes a middle post and a plurality of foldable frame arms; the middle post includes a first end and a second end; and each foldable frame arm includes a plurality of ribs and a plurality of links.

In another embodiment, the middle post has a linear actuator structure, and the first end of the middle post moves relative to the second end of the middle post along an axis of the middle post.

In another embodiment, the linear actuator structure includes a non-rotating nut and a rotating screw shaft.

In another embodiment, the middle post is parallel to the fuselage.

In another embodiment, two ribs of the plurality of ribs are pivotably attached to the first and second ends of the middle post, and remaining ribs are sequentially pivotably attached to the two ribs.

In another embodiment, the plurality of links are pivotably attached to the plurality of the ribs, and the plurality of links and the plurality of the ribs form a plurality of quadric link structures.

In another embodiment, the plurality of links and the plurality of the ribs form a plurality of scissor arms.

In another embodiment, the drone capture device includes a foldable capture net, and ends of the foldable capturing net are attached to distal ends of the plurality of the foldable frame arms.

In another embodiment, the drone capture device includes a chamber housing, and the foldable capture net is folded in the chamber housing before being deployed.

In another embodiment, the drone capture device includes a deploying reel, a center of the foldable capture net is attached to the deploying reel, and the foldable capture net is coiled on the deploying reel.

In another embodiment, the foldable capturing net includes frame threads, spiral threads, radius threads, and auxiliary radius threads.

In another embodiment, the drone capture aerial vehicle further includes: a plurality of deploying attach points that are located on the middle post; a plurality of guiding rings that are attached onto each foldable frame arm; a plurality of end deploying reels that are attached to an end of each foldable frame arm; and threads. The threads connect the deploying attach points, the plurality of guiding rings, and the plurality of end deploy reels in a zigzag fashion; and the threads slide through the guiding rings.

In another embodiment, the drone capture aerial vehicle includes a multi-rotor configuration, a helicopter configuration, or a fixed wing airplane configuration.

In another embodiment, in the plurality of quadric link structures, a movement of the first end of the middle post towards the second end of the middle post causes the plurality of ribs and the plurality of links to stretch outwards from the middle post; and a movement of the first end of the middle post away from the second end of the middle post causes the plurality of ribs and the plurality of links to fold to positions substantially parallel and juxtapositionally close to the middle post.

In one embodiment, the present invention provides a method of capturing a drone. The method includes providing a drone capture aerial vehicle, the drone capture aerial vehicle having a drone capture device and the drone capture device having a foldable capture net; flying the drone capture aerial vehicle toward the drone; activating the drone capture device to deploy the foldable capture net; and capturing the drone with the capture net.

In another embodiment, the drone capture aerial vehicle further includes a fuselage, the drone capture device includes a middle post and a plurality of foldable frame arms; the middle post includes a first end and a second end; and each foldable frame arm includes a plurality of ribs and a plurality of links.

In another embodiment, ends of the foldable capturing net are attached to distal ends of the plurality of the foldable frame arms.

In another embodiment, the drone capture device includes a chamber housing, and the foldable capture net is folded in the chamber housing before being deployed.

In another embodiment, the drone capture device includes a deploying reel, a center of the foldable capture net is attached to the deploying reel, and the foldable capture net is coiled on the deploying reel.

In another embodiment, drone capture aerial vehicle further includes: a plurality of deploying attach points that are located on the middle post; a plurality of guiding rings that are attached onto each foldable frame arm; a plurality of end deploying reels that are attached to an end of each foldable frame arm; and threads. The threads connect the deploying attach points, the plurality of guiding rings, and the plurality of end deploy reels in a zigzag fashion; and the threads slide through the guiding rings.

BRIEF DESCRIPTION OF THE DRAWINGS

The accompanying drawings, which are included to provide a further understanding of the invention and are incorporated in and constitute a part of this specification, together with the description, illustrate embodiments of the invention and explain the principles of the invention.

In the drawings:

FIG. 1A, FIG. 1B and FIG. 1C present the first embodiment of the frame assembly.

FIG. 3A and FIG. 3B show one embodiment of the drone capture device, in which the capturing net is stored in a deploying chamber.

FIG. 4A and FIG. 4B show another embodiment of the drone capture device, in which the capturing net is coiled on a deploying reel.

FIG. 5A through FIG. 5D illustrate yet another embodiment of the drone capture device, in which the capturing net is formed by individual threads coiled on multiply deploying reels and slide through guiding rings on the frame arms.

FIG. 6A and FIG. 6B show a counter-drone quadcopter UAV equipped with the drone capture device described by the FIG. 4A and FIG. 4B.

FIG. 8A and FIG. 8B show a fixed wing counter-drone UAV equipped with the drone capture device described by the FIG. 3A and FIG. 3B.

DETAILED DESCRIPTION OF THE ILLUSTRATED EMBODIMENTS

The UAV capture device is comprised of a foldable frame assembly, a foldable capturing net attached to said frame assembly and deploying device of the capturing net. When the capture procedure starts, the foldable frame assembly extends to support the foldable capturing net to deploy from its deploying device to reach the largest coverage of capturing, so that the probability of intercepting the targeted UAV is maximized.

Figure 1A:
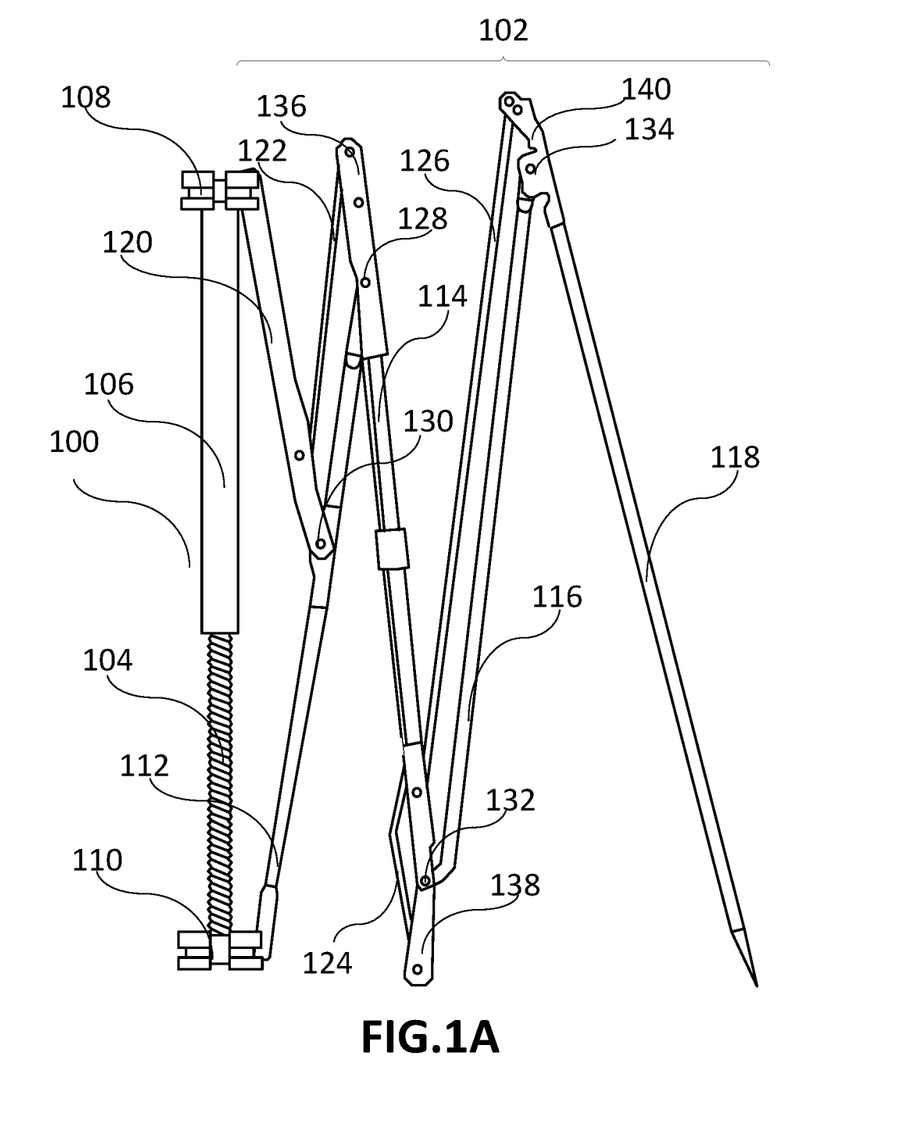
FIG. 1A is a side view of a frame arm attaches to the middle post.

As shown in the FIG. 1A, the foldable frame assembly consists of a middle post 100 and a plurality of foldable frame arms 102 mounted on the middle post 100 (only one is shown in the FIG. 1A). The middle post 100 has a linear actuator structure. In a common embodiment, the linear actuator structure has two coaxial parts: a rotating screw shaft 104 and a non-rotating nut 106. The rotating screw shaft 104 has an external thread in threaded connection with an internal thread on the non-rotating nut 106. A driving device, such as an electrical motor, drives the rotation of the screw shaft 104 and convert the rotation of the screw shaft 104 to the linear longitudinal motion of the screw shaft 104 related to the nut 106 along their axes.

The upper notch 108 is attached to the nut 106 and the lower notch 110 is attached to the screw shaft 104. The lower notch 110 is sleeved through the screw shaft 104 such that the rotation of the screw shaft 104 may not cause the rotation of the lower notch 110, but the longitudinal movement of the screw shaft 104 can bring along the lower notch 110 to move in the same longitudinal direction.

a plurality of 4-folded frame arms 102 are mounted on the said upper notch 108 and lower notch 110 in radial fashion around the middle post 100, each includes a first rib 112, a second rib 114, a third rib 116, a fourth rib 118, a top rib 120, a first link 122, a second link 124 and a third link 126. The proximal end of the first rib 112 is pivotably attached to the lower notch 110, the distal end of the first rib 112 is pivotably attached to the proximal end of the second rib 114 through the pivot joint 128. The proximal end of the third rib 116 is pivotably attached to the distal end of the second rib 114, the distal end of the third rib 116 is pivotably attached to the proximal end of the fourth rib 118. The top rib 120 has its proximal end pivotably attached to the upper notch 108 and its distal end pivotably attached to the middle segment of the first rib 112 through the pivot joint 130.

The second rib 114 has an extension portion 136 extends inward from its proximal end, the first link 122 has its distal end pivotably attached to the extension portion of the second rib 114 and its proximal end pivotably attached at the top rib 120 through a pivot joint near the pivot joint 130. The first link 122 is substantially parallel to the first rib 112.

The third rib 116 has an extension portion 138 extends from its proximal end, and second link 124 has its distal end pivotably attached to the extension portion 138 and its proximal end pivotably attached to the first rib near the pivot joint 128. The second link 124 is substantially parallel to the second rib 114.

The fourth rib 118 has an extension portion 140 extended from its proximal end, and the third link 126 has its distal end pivotably attached to the extension portion 140 of the fourth rib 118 and its proximal end pivotably attached to the second rib 114 near the pivot joint 132. The third link 126 is substantially parallel to the third rib 116.

The first rib 112, the second rib 114, the top rib 120 and the first link 122 are pivotably connected to form the first quadric link structure; The first rib 112, the second rib 114, the third rib 116 and the second link 124 are pivotably connected to form the second quadric link structure; The second rib 114, the third rib 116, The fourth rib 118, and the third link 126 are pivotably connected to form the third quadric link structure. These three quadric link structures cascade together to form the overall foldable frame arm.

Figure 1B:
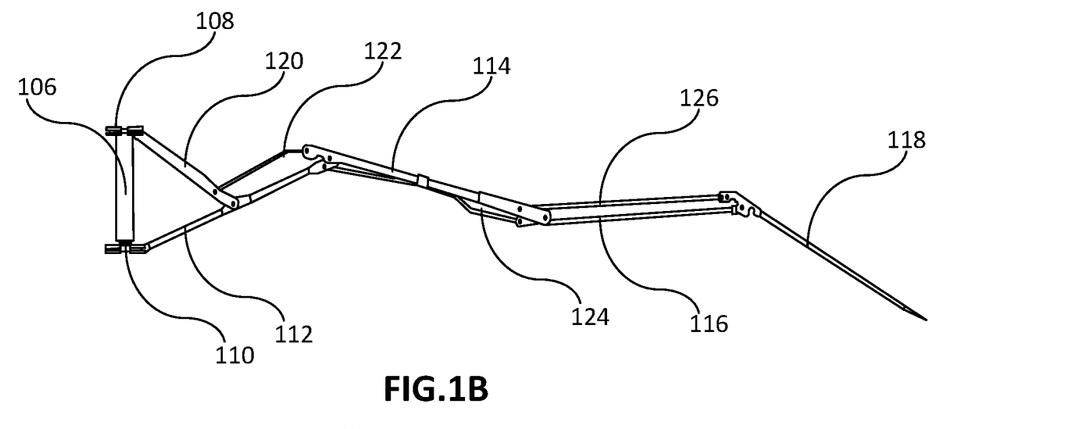
FIG. 1B is the side view of the same frame arm in its deployed position.

As shown in the FIG. 1B, by moving the lower notch 110 towards the upper notch 108, the first rib 112 and the top rib 120 are stretched outwards from the middle post. As the result, the first link 122, the second rib 114, the second link 124, the third rib 116, the third link 126 and the fourth rib 118 are also stretched subsequently. As a plurality of 4-folded frame arms 102 are stretched around the middle post 100, the umbrella-shaped frame assembly reaches its largest canopy to cover the largest capturing area. When moving the lower notch 110 away from the upper notch 108, The first rib 112 is impelled by the lower notch 110 to collapse toward the middle post 100. In the meantime, the top rib 120, the first link 122, the second rib 114, the second link 124, the third rib 116, the third link 126 and the fourth rib 118 are also dragged subsequently to collapse towards the middle post 100. When the umbrella-shaped frame assembly is fully collapsed, the ribs and the links are substantially parallel to the middle post 100 and are folded in in a compacted form as shown in the FIG. 1C.

The frame arms 102 may be inversely attached to the middle post 100. The top rib 120 can be pivotably attached to the lower notch 110 and the first rib 112 can be pivotably attached to the upper notch 108.

Figure 1C:
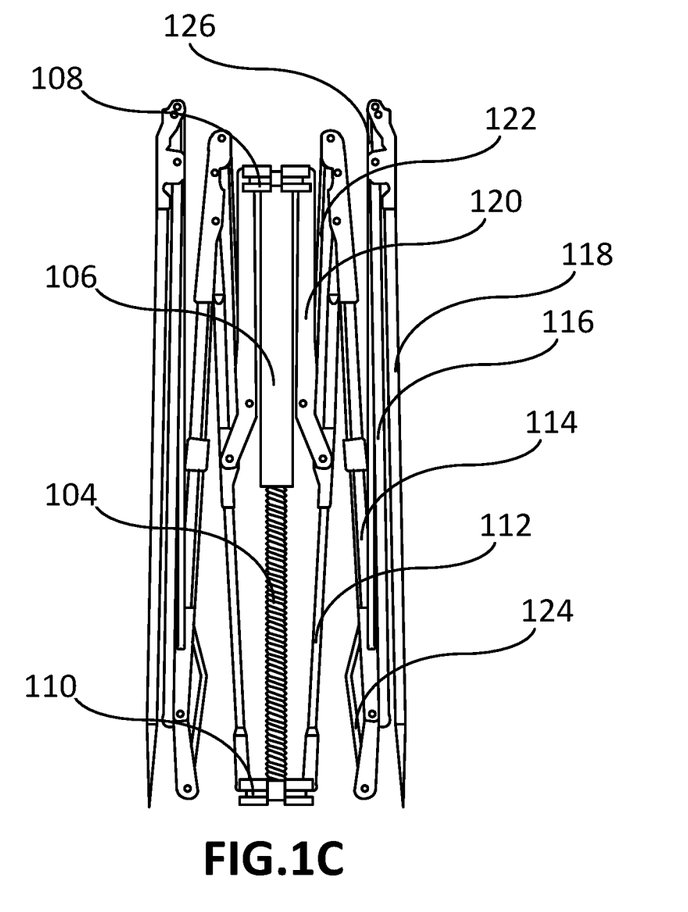
FIG. 1C shows the whole frame assembly in its stowed position with multiply frame arms attached to the middle post.

Although the FIG. 1A, FIG. 1B and FIG. 1C show 4-folded frame arms. The frame arms can be designed as 3-folded (two cascaded quadric link structures), 5-folded (four cascaded quadric link structures) or any other similar structures.

Figure 2:
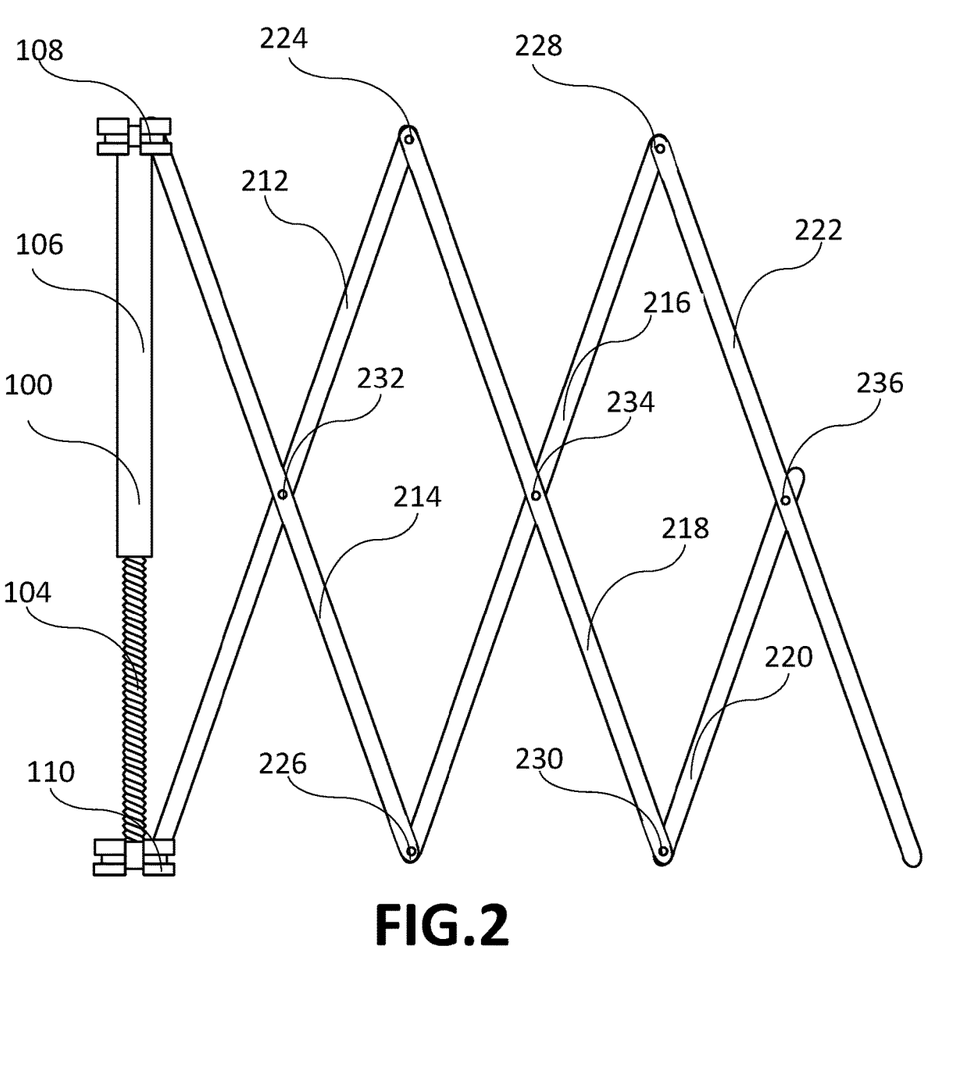
FIG. 2 is another embodiment of the foldable frame arm.

Alternatively, the frame arm can be implemented as extendable scissor arms as shown in the FIG. 2. The first stage scissor arms 212 and 214, pivotably attached to the upper and lower notches at their proximal end respectively. The distal end of the first stage scissor arm 212 is pivotably attached to the proximal end of the second stage scissor arm 218 through pivot joint 224; The distal end of the first stage scissor arm 214 is pivotably attached to the proximal end of the other second stage scissor arm 216 through pivot joint 226. Moreover, the first stage scissor arms 212 and 214 are attached with each other at their middle section through the pivot joint 232.

The second stage scissor arms 216 and 218 are connected with the third stage scissor arms 220 and 222 in similar fashion. As requirements demand, the extendable scissor arms can have 3 or more extendable stages.

Figure 3A:
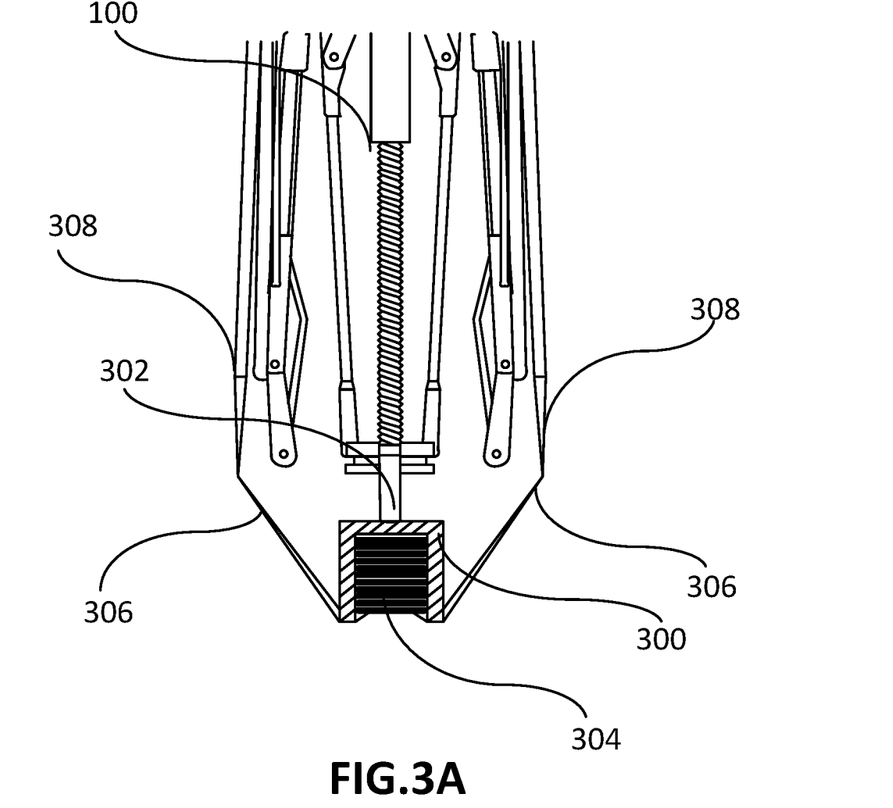
FIG. 3A is a partial sectional side view of the drone capture device with the capturing net in its stowed position.
Figure 3B:
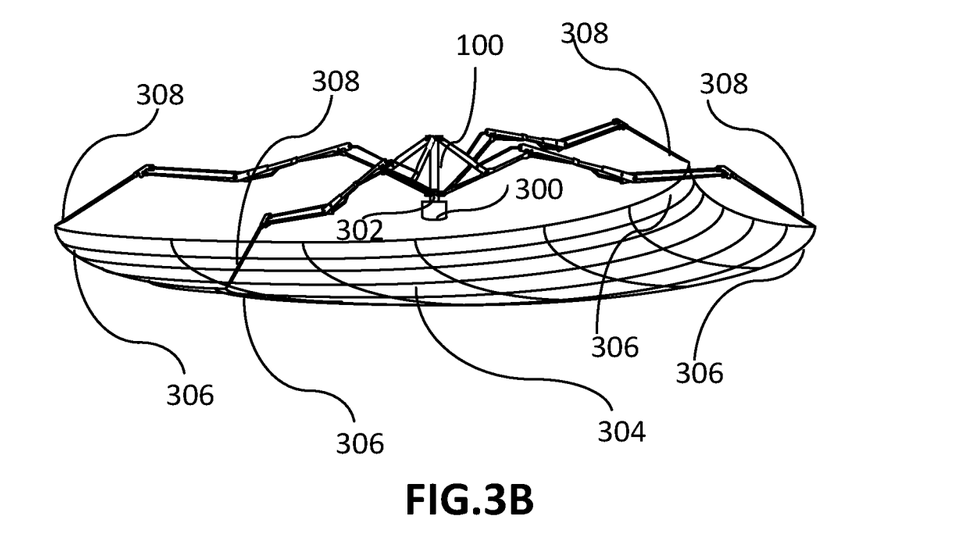
FIG. 3B is the overall view of the same drone capture device with the capturing net in its deployed position.

FIG. 3A and FIG. 3B shows the first embodiment of the capturing net and its deploying device. The deploying device 300 is attached to the end of the middle post 302 and has a chamber housing the foldable capturing net 304. The FIG. 3A shows the sectional view of the deploying device 300, the capturing net is folded or coiled inside the chamber of the deploying device 300 with its tips 306 extended outside through the opening of the deploying device 300 and attached with the ends of the frame arms 308. Only two frame arms are shown in the FIG. 3A although the frame assembly may have more than two of the frame arms.

As the arms of the frame assembly extend outward, the capturing net 304 is dragged out of the chamber of the deploying device 300 through its opening and extend to cover the maximum capture area, ready to intercept the targeted drone. The FIG. 3B illustrates the frame assembly and the capturing net in their fully deployed state. In the fully deployed state, the capturing net is attached to the frame assembly at the distal end of its frame arms.

To facilitate the deploying the capturing net from its folded state to the deployed state, some pushing mechanism can be implemented to push the capturing net 304 out of the chamber of the deploying device 300 through its opening during the deployment.

Figure 4A:
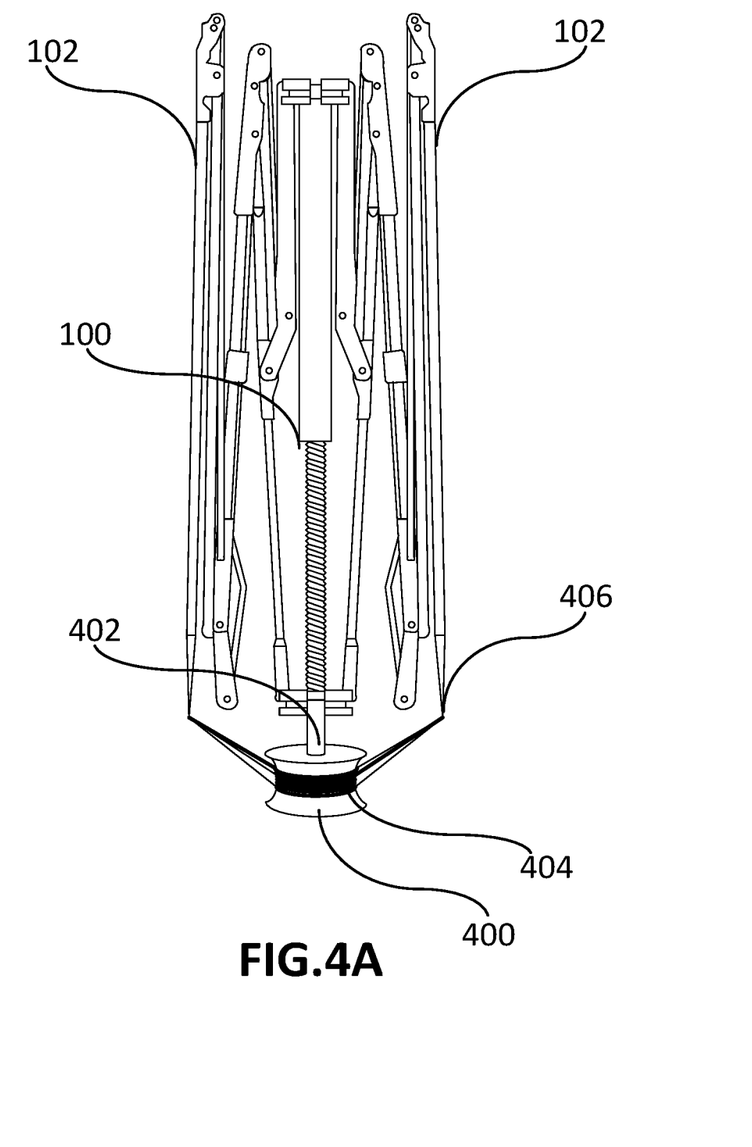
FIG. 4A is a sectional side view of the drone capture device in its stowed position.

FIG. 4A shows the second embodiment of the capturing net and its deploying device. A deploying reel 400 is pivotably mounted on its rotation axis 402 extended from the middle post 100 and a capturing net 404 attaches its center to the reel 400, and its outmost tips 406 are attached to the distal ends of the foldable frame arms 102. When the drone capture device is in its stowed position, the foldable frame arms 102 are folded toward the center post 100. The capturing net 404 is coiled on the groove of the reel 400. A lock mechanism stops the reel 400 from rotating and deploying the net. When capturing net 404 starts deploying, the foldable frame arms 102 will be stretch outward from the middle most 100, causing the capturing net 404 to spread. The distal ends of the foldable fame arms drag the outmost tips 406 of the capturing net outward, the reel 40 rotates to uncoil and release the capturing net 404. When the foldable fame assemblies are fully stretched the capturing net 404 reaches its full canopy.

Figure 4B:
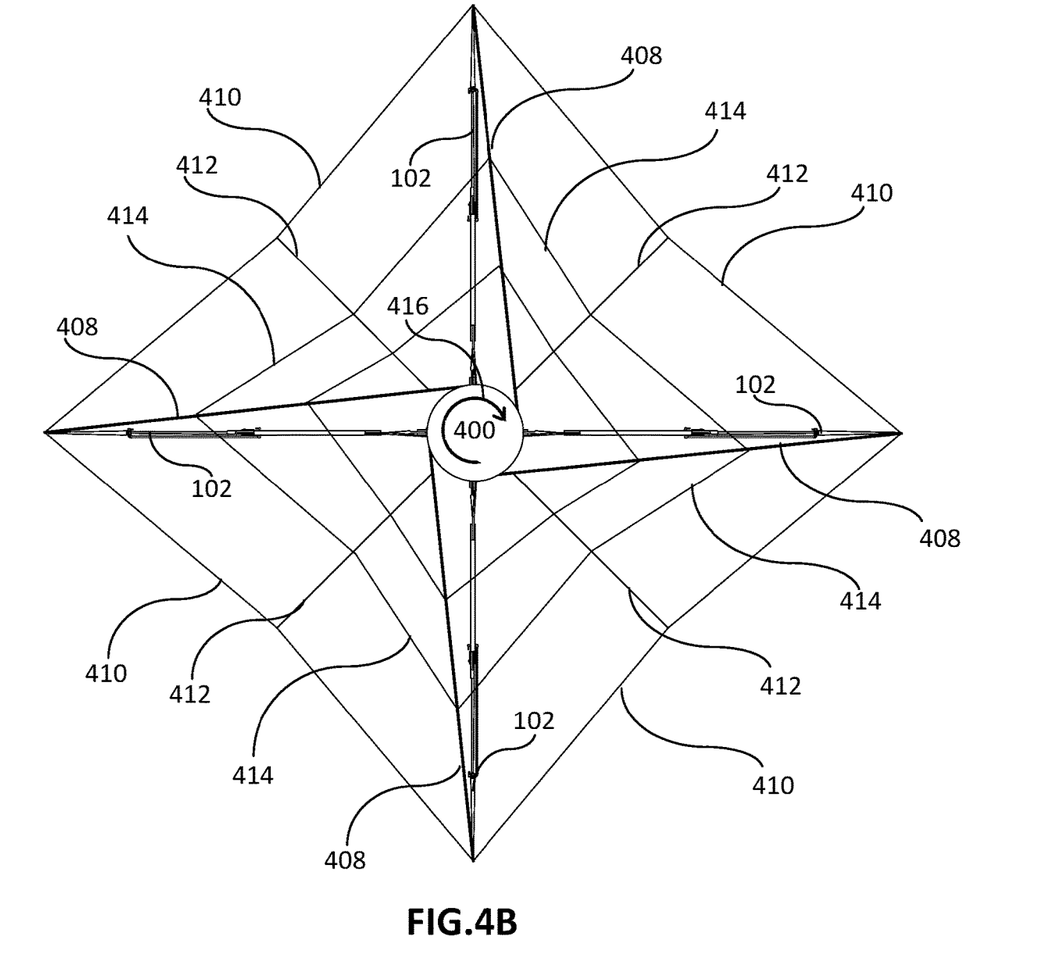
FIG. 4B is the bottom view of the same drone capture device in its deployed position.

FIG. 4B is the bottom view of the same drone capture device as shown in FIG. 4A in its fully deployed state. A plurality of supporting radius threads 408 each connects the deploying reel 400 at one end and the distal end of the one of frame arms at the other end. A plurality of frame threads 410 each connects the adjacent distal ends of the frame arms defining the limit of the capturing net canopy. A plurality of auxiliary radius threads 412 each connects the deploying reel 400 at one end and tethers to mid-section of the frame thread 410 at the other end. One or multiple rounds of spiral threads 414 tether the radius threads 408 and the auxiliary radius threads 412 in circular fashions. The spiral threads 414, radius threads 408, frame threads 410 and the auxiliary radius threads 412 together form a capturing net which can intercept the targeted drone and entangle any part of the targeted drone, such as its propellers.

The second embodiment of the drone capture device shown in the FIG. 4A and FIG. 4B can be retracted from its fully deployed state back to its stowed state. In FIG. 4B, when the frame assemblies fold to their stowed position. The deploying reel 400 rotates in the direction illustrated by the arrow 416. As the result, the radius threads 408 and the auxiliary radius threads 412 of the capturing net are coiled on the deploying reel 400. The frame threads 410 and spiral threads 414 will be folded and finally coil onto the groove on the deploying reel 400.

Some or all parts of the capturing net 400 can be made of elastics material to keep them substantial straight in the deploying and retracting process so that they don't entangle with the other part of the capturing net and frame assembly.

Figure 5A:
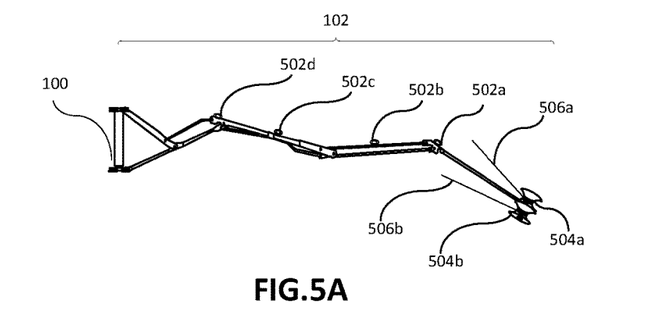
FIG. 5A is the side view of one frame arm in deployed position with the deploying reels and the guiding rings attached on it.
Figure 5B:
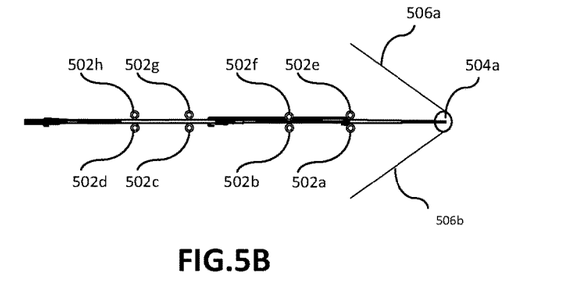
FIG. 5B is the top view of the same frame arm.

In the third embodiment, the capturing net is organized to attach the frame assemblies in another way. As shown in the FIG. 5A and FIG. 5B, A plurality of guiding rings 502a, 502b, 502c, 502d, 502e, 502f, 502g, 502h are attached to each frame arm at different sections. A plurality of deploying reels, such as 504a and 504b are attached at the end of each frame arm. A plurality of threads, such as 506a and 506b, each is coiled on one of the deploying reels, and can be extended out from or retracted back to its deploying reel.

Figure 5C:
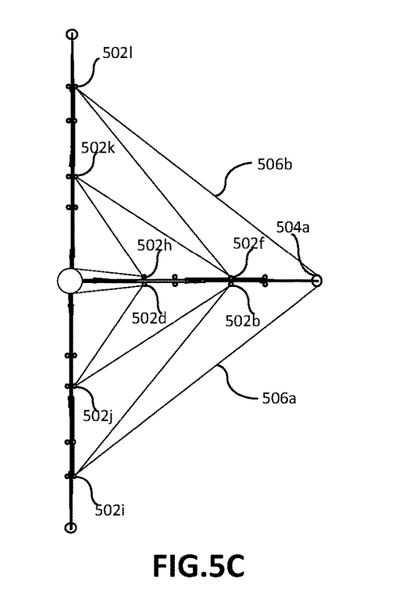
FIG. 5C shows the connections of the threads between neighboring frame arms to form the capturing net.

FIG. 5C shows the details connections of the threads 506a and 506b. The thread 506a is extended from its deploying reel 504a, slides through the guiding rings 502i, 502b, 502j and 502d (502i and 502j are guiding rings on the adjacent frame arms) in zigzag fashion and finally attached to the middle post 100 or one of the frame arms. The other thread 506b is extended from the deploying reel 504b, and slides through the guiding rings 502l, 502f, 502k and 502h at the other side in same zigzag fashion.

Figure 5D:
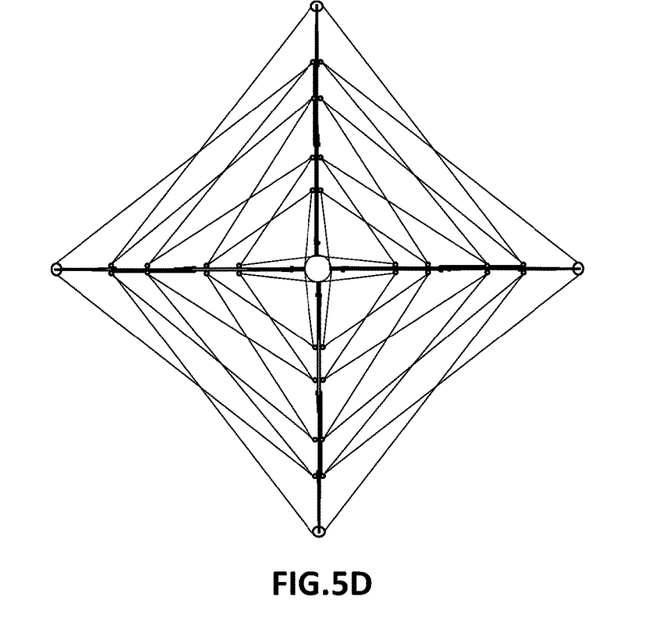
FIG. 5D demonstrates the overall frame assembly and capturing net in their fully deployed position.

FIG. 5D illustrates the overall capturing net consists of all the threads connected in the similar zigzag fashion. All the threads together form a capturing net attached on the frame assembly. As the frame assembly folds back to its stowed position, the threads will be retracted back to their own deploying reels.

Figure 6A:
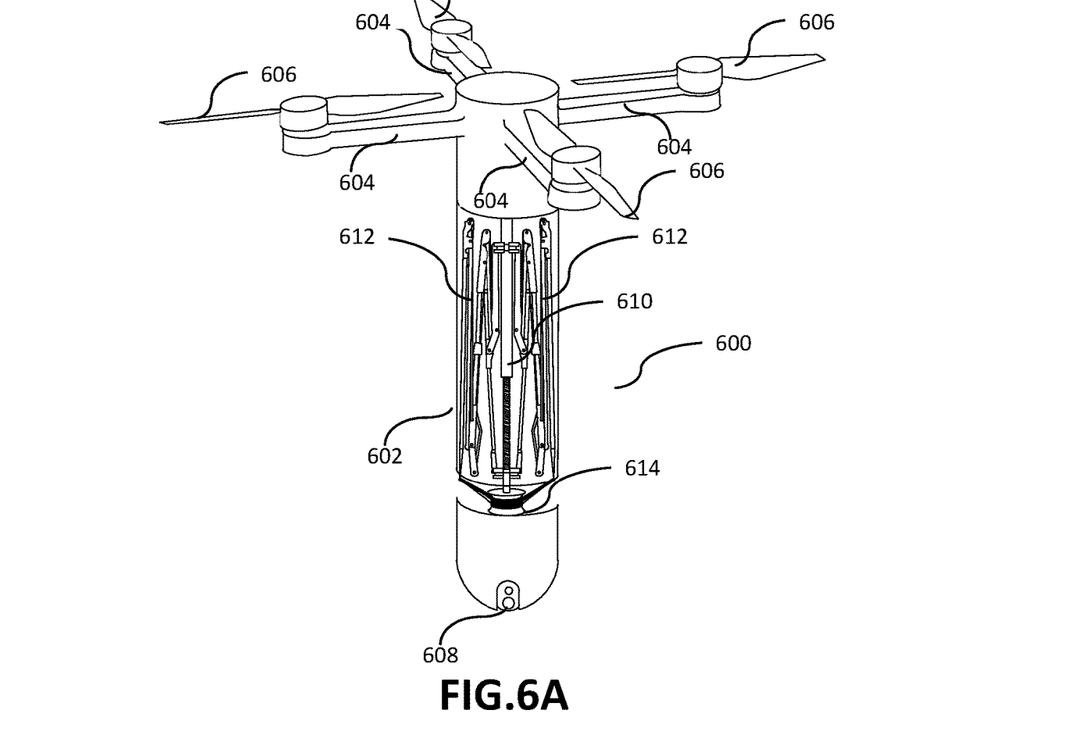
FIG. 6A is the sectional side view of the quadcopter UAV with the drone capture device folded within the fuselage of the quadcopter UAV.
Figure 6B:
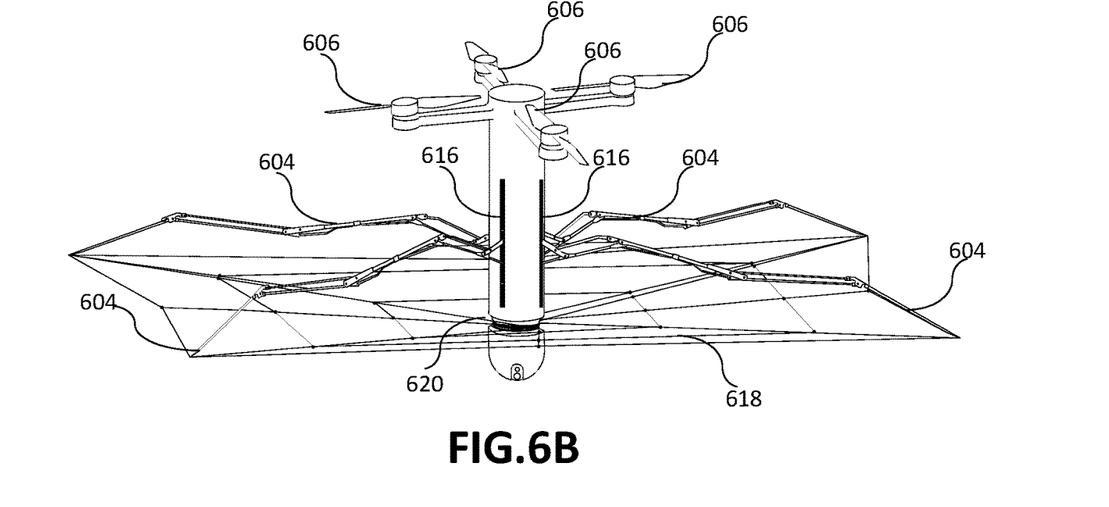
FIG. 6B shows the same quadcopter UAV when the drone capture device is fully deployed.

FIG. 6A and FIG. 6B demonstrate a counter-drone quadcopter UAV equipped with the drone capture device of the second embodiment.

FIG. 6A is a schematic sectional view of said counter-drone quadcopter UAV. The counter-drone quadcopter UAV 600 has an elongated central fuselage 602 from which radiate four of support arms 604. Each support arm 604 is equipped at its distal end with a propulsion unit comprising a motor driving the rotation of a propeller 606. Preferably, each propeller rotates on a plane perpendicular to the axis of said central fuselage 602.

Four of the propellers 606 are such configured that two of them rotate clockwise and the other two rotate counter-clockwise, forcing air downward and lifting the quadcopter UAV 600 in an upwardly direction. Independent control on the rotation speed of each propeller 606 is applied. By varying the rotation speed of each propeller 606, it is possible to specifically generate a desired total thrust; to locate the center of thrust; and to create a desired total torque, or turning force.

Although the counter-drone 600 in FIG. 6A is illustrated having four propulsion units, the quadcopter UAV may have three or more than four propulsion units as performance and mission demands dictate.

An aiming system 608 is installed at the nose end of the fuselage 602 of the quadcopter UAV to detect and track the targeted drone during the capturing process. A camera, a radar or a lidar or any combination of the mentioned sensors, can be used by the aiming system 608 to search and lock the targeted drone based on the targeted drone's signatures, such as its shape or speed. Once the targeted drone is locked, the aiming system 608 tracks the targeted drone and adjust the position and attitude of quadcopter UAV 600 to point the nose end of the fuselage to the targeted drone.

In FIG. 6A, the drone capture device is in stowed position, the frame arms 612 are folded within the elongated fuselage 602 with its middle post 610 substantially parallel or align with the longitude axis of the quadcopter's fuselage 602. Each frame arms can be extended outside the fuselage through an opening 616 on the fuselage (shown in FIG. 7B). The capturing net is coiled around the deploying reel 614 and can be stretched out through a circular opening of the fuselage around the deploying reel 614.

FIG. 6B illustrates the quadcopter UAV 600 with its drone capture device in the deployed state. The frame arms 612 are fully stretched outside the quadcopter's fuselage, the capturing net 618 uncoils from the deploying reel and expend to its full coverage. As the quadcopter UAV 600 travel through the air towards the targeted drone, the capturing net could hit and entangle with the targeted drone.

FIG. 7A, FIG. 7B, FIG. 7C and FIG. 7D show the dynamics of the quadcopter UAV 600 during drone capturing procedure. In the FIG. 7A, the quadcopter UAV 600 hovers near its guard air searching for the targeted drone 700. Once the quadcopter UAV 600 detected the target drone through its aiming system, the quadcopter UAV approaches the targeted drone, points its nose towards the targeted drone and tries to align the fuselage axis 702 with the targeted drone.

Figure 7A:
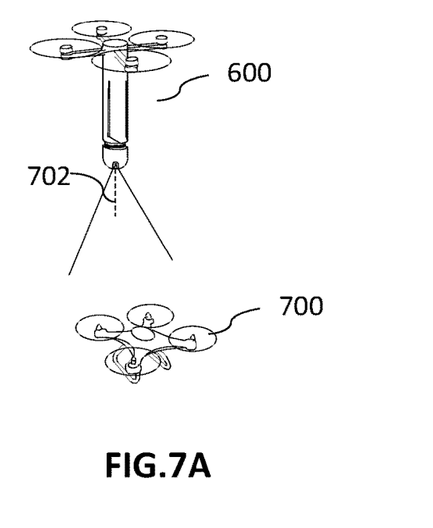
FIG. 7A through FIG. 7D show the prospective dynamics of the drone capture process of the counter-drone quadcopter UAV described by the FIG. 6A and FIG. 6B.
Figure 7B:
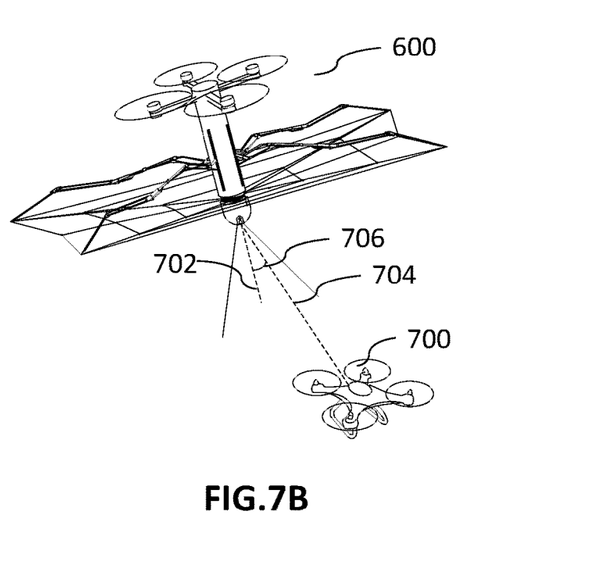

When the target is within lock-on range 704 and angle of off-centeredness 706 is within lock-on angle range, the quadcopter UAV 600 deploys its capturing net and dashes towards the targeted drone 700 as shown in the FIG. 7B. The preferable lock-on range would be 50 m, 45 m, 40 m, 35 m, 30 m, 25 m, 20 m, 15 m or 10 m. The preferable lock-on angle range would be +/−90 degrees, +/−80 degrees, +/−70 degrees, +/−60 degrees, +/−50 degrees, +/−40 degrees, +/−30 degrees, +/−20 degrees or +/−10 degrees.

Figure 7C:
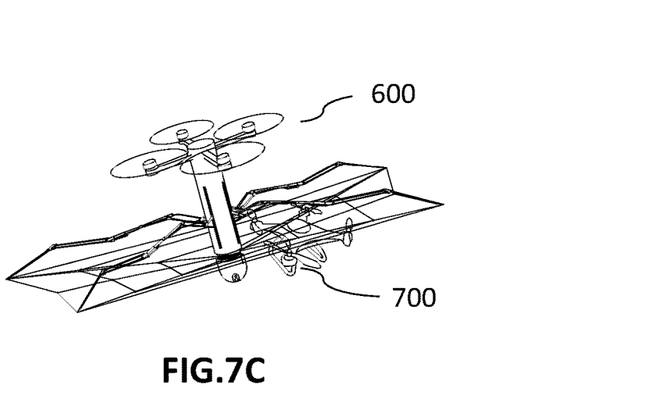
Figure 7D:
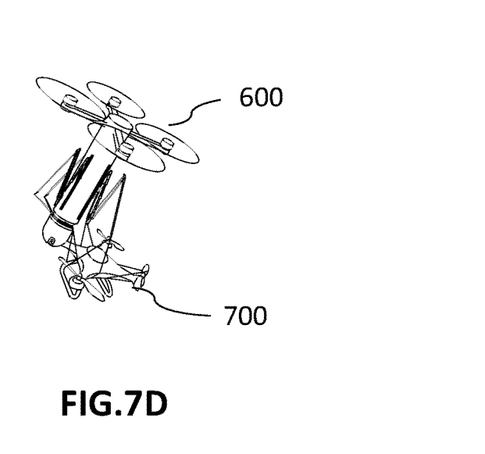

In FIG. 7C, as the quadcopter UAV 600 passes the target, the capturing net hits and entangles the target drone 700. In FIG. 7D, as the quadcopter UAV 600 folds its frame arms and retract its net, the quadcopter UAV 600 try to regain its balance in the air and bring the target drone 700 to the designated location.

If the first-round attack fails, the quadcopter UAV 600 can then reposition itself to launch more attacks until its captures the target. During repositioning, the quadcopter UAV 600 can fold its frame assembly and retract its capturing net to reduce the air drag.

Figure 8A:
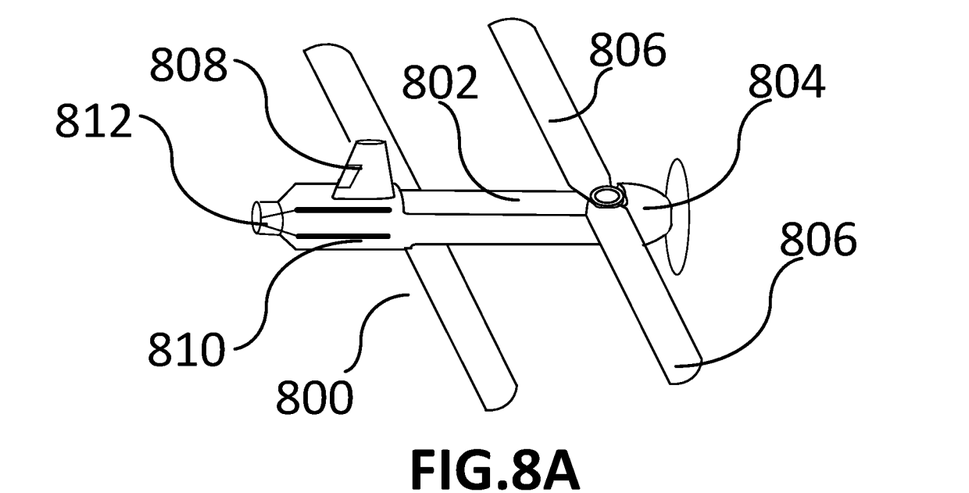
FIG. 8A is the side view of the fixed wing UAV with the drone capture device folded within the fuselage of the counter-drone UAV.
Figure 8B:
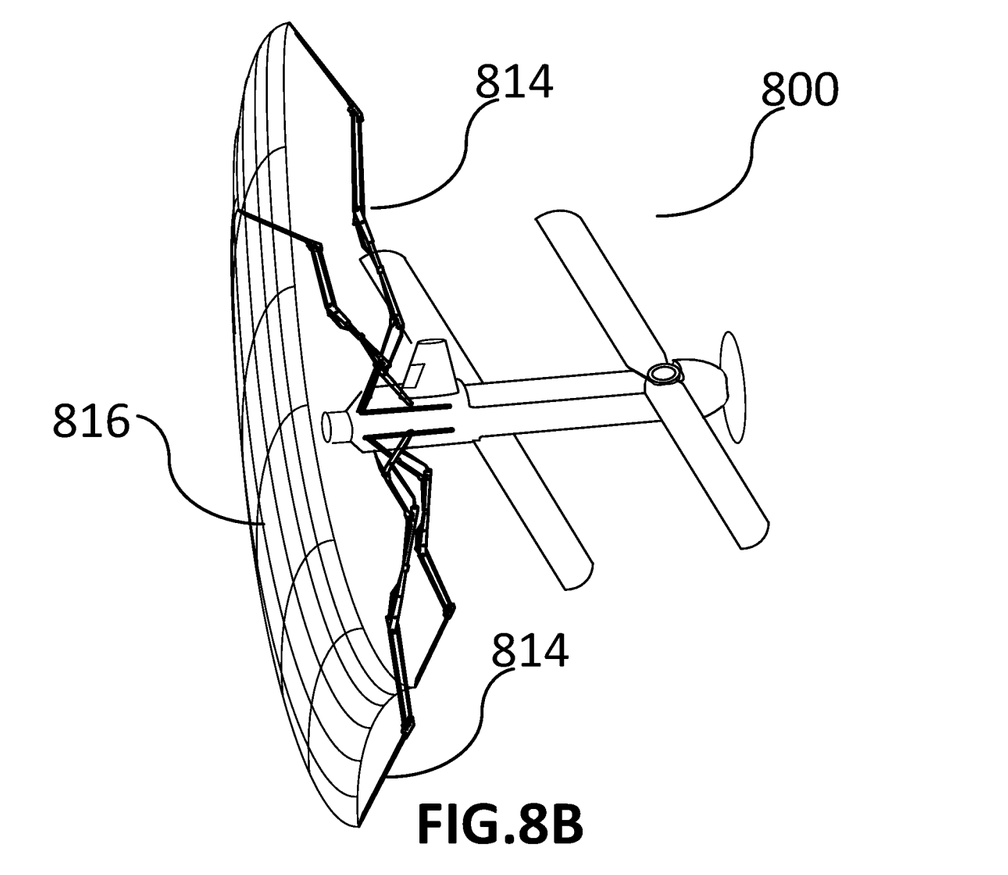
FIG. 8B shows side view of the same UAV when the drone capture device is fully deployed.

FIG. 8A and FIG. 8B describe a fixed wing UAV (unmanned air vehicle) equipped with the drone capture device described as the first embodiment in FIG. 3A and FIG. 3B.

FIG. 8A shows the counter-drone fixed wing UAV 800 with the drone capture device in its stowed position. The fixed wing UAV 800 has an elongated fuselage 802, which is substantially parallel to the horizontal ground when the UAV 800 was driven by a plurality of propellers and moves towards the direction that its nose 804 points to in its cruise flight. A plurality of air foils 806 generate lifting force for the fixed wing UAV 800 during its flight. A plurality of control surfaces 808, such as rudders, elevators, ailerons and so on are used to control the flight attitude of the UAV 800.

The frame arms 814 (shown in the FIG. 8B) of the drone capture device are folded within the tail section of the UAV 800 and can be stretched outside from a plurality of elongated openings 810 parallel to the axis of the fuselage 802. A chamber 812 housing the foldable capturing net 816 is attached at the tail end of the UAV 800. The chamber 812 has an opening facing opposite to the UAV's flight direction. The tips of the capturing net stretched out of the chamber from the opening and connected to the end of the folded frame arms 814.

FIG. 8B illustrate the fixed wing unmanned air vehicle 800 As the frame arms stretch outward and the capturing net 816 is released outside of the chamber 812 through its opening and extend by the frame arms 814 to cover the maximum capture area, ready to intercept the targeted drone.

Figure 9A:
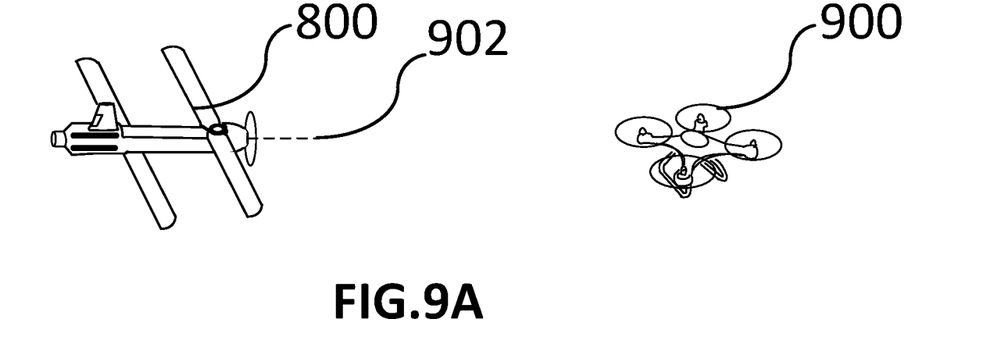
FIG. 9A through FIG. 9C show the prospective dynamics of the drone capture process of the fixed wing UAV described by the FIG. 8A and FIG. 8B.
Figure 9B:
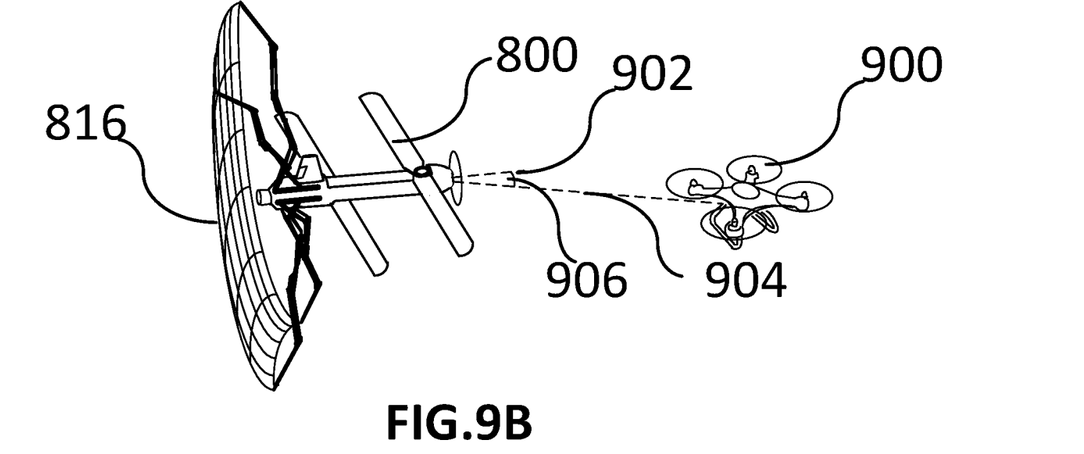
Figure 9C:
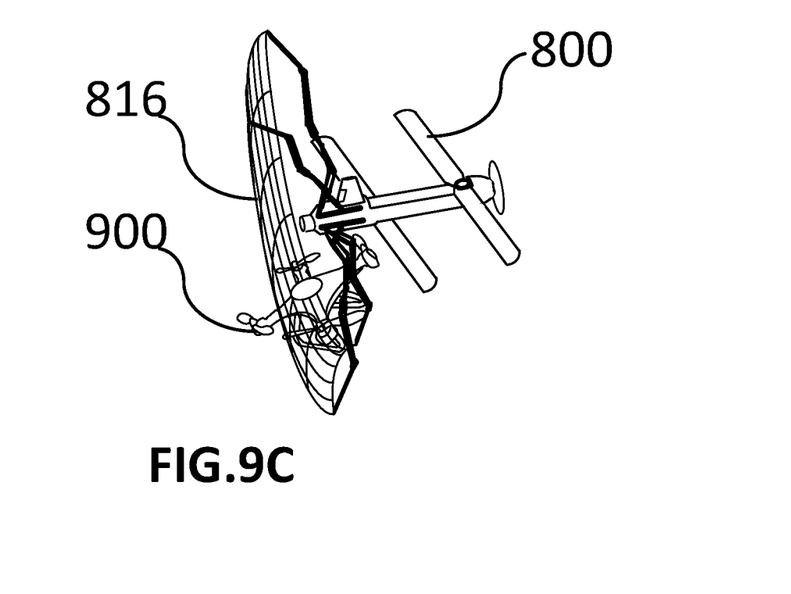

FIG. 9A, FIG. 9B and FIG. 9C demonstrate the dynamics of the counter-drone fixed wing UAV 800 during drone capturing procedure.

As illustrated in FIG. 9A, upon identification of the targeted drone 900 in the air, the fixed wing UAV 800 adjusts its attitude, flight direction and speed to approach to the targeted drone 900 with the fuselage axis 902 of the fixed wing UAV substantially pointed to the targeted drone 900.

Once the targeted drone 900 is within certain lock-on range 904 and the angle of off-centeredness 906 is within lock-on angle range, the drone capture device on the UAV 800 deploys the frame assembly and the capturing net and launch the attack towards the targeted drone 900 as shown in FIG. 9B. The preferable lock-on range would be 50 m, 45 m, 40 m, 35 m, 30 m, 25 m, 20 m, 15 m or 10 m. The preferable lock-on angle range would be +/−90 degrees, +/−80 degrees, +/−70 degrees, +/−60 degrees, +/−50 degrees, +/−40 degrees, +/−30 degrees, +/−20 degrees or +/−10 degrees.

As the fixed wing UAV 800 passes by the target drone 900, the capturing net capture 816 captures and entangles the targeted drone 900 as shown in the FIG. 9C. The fixed wing UAV 800 adjusts its attitude to balance mass of its own and the captured drone before it can land at the designated location.

In case of failed capture, the fixed wing UAV 800 can reposition itself to launch next round of attack.

Figure 10:
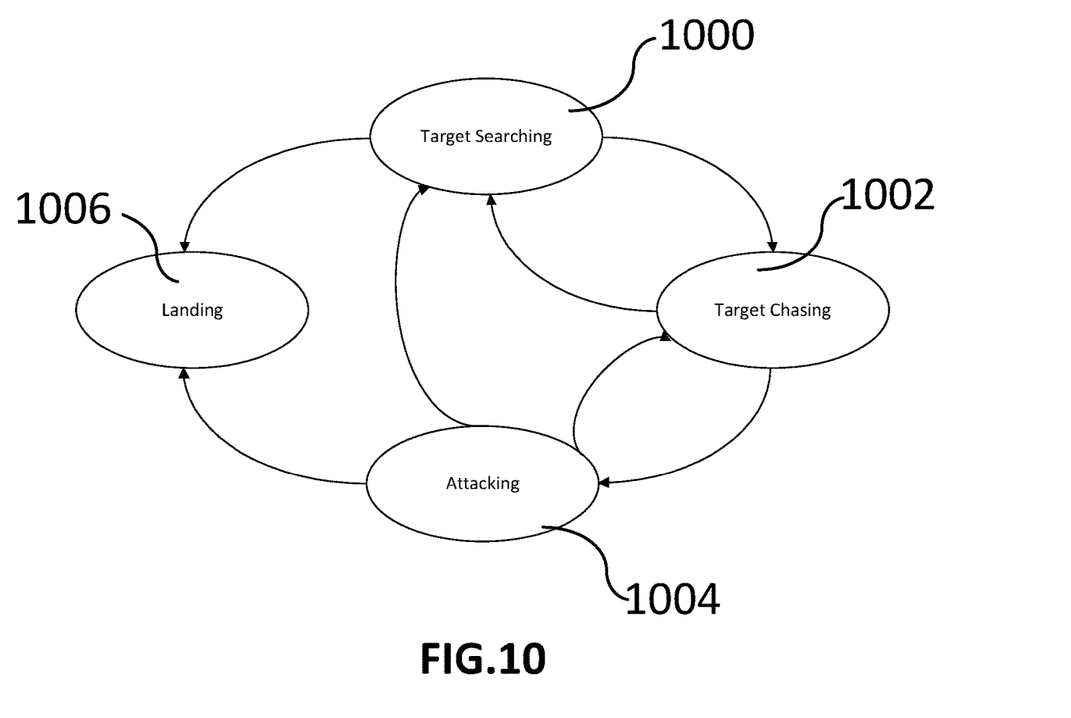
FIG. 10 is an exemplary state diagram envision of the general counter-drone operations of the counter-drone UAV equipped with the drone capture device described by the current invention.

An exemplary state diagram is provided in FIG. 10 to describe the behavior of the counter-drone UAV equipped with drone capture device of current invention. After the launch, the counter-drone UAV is initialized to the target searching state 1000, where the on-board sensors of the counter-drone UAV, such as a camera, search the area of interest to detect any signature of potential threat drone.

Alternatively, the information of the potential threat drone, such as its location and signatures, could come from other parties, such as a ground control station or other UAVs work together with the counter-drone UAV. Once the potential threat drone is identified by the counter-drone UAV and confirmed to be the target of capture. The counter-drone UAV transition to the target chasing state 1002. In the target chasing state, the aiming system of the counter-drone UAV actively tracks the movement of the targeted drone and guide the counter-drone UAV to maneuver to get close to the targeted drone. The counter-drone UAV try to point longitude axis of the capture device to the targeted drone to prepare the attack launching at the end of the close-in maneuver.

When it is determined that the targeted drone is within the lock-on range and lock-on angle of the counter-drone UAV, the transition from the target chasing state 1002 to attacking state 1004 can happen. In the attacking state, the counter-drone UAV deploys its drone capture device and flies towards the targeted drone in order to capture and entangle it on the capturing net extended by the drone capture device.

If the targeted drone is successfully captured by the capturing net in the attacking state 1004, the counter-drone UAV enters the landing state 1006, where it brings the captured drone to a designated location. If the attack is failed but the aiming system is still tracking the targeted drone, the counter-drone UAV re-enters the chasing state 1002 preparing for the next round of attack. If the attack is failed and the aiming system loses the track of the targeted drone, the counter-drone UAV need to go back to target searching state 1000 to acquire its target again.

What is claimed is:

1. A drone capture aerial vehicle comprising:
   a fuselage; and
   a drone capture device,
   wherein the drone capture device includes a middle post and a plurality of foldable frame arms; the middle post includes a first end and a second end; and each foldable frame arm includes a plurality of ribs and a plurality of links.

2. The drone capture aerial vehicle of claim 1, wherein the middle post has a linear actuator structure, and the first end of the middle post moves relative to the second end of the middle post along an axis of the middle post.

3. The drone capture aerial vehicle of claim 2, wherein the linear actuator structure includes a non-rotating nut and a rotating screw shaft.

4. The drone capture aerial vehicle of claim 1, wherein the middle post is parallel to the fuselage.

5. The drone capture aerial vehicle of claim 1, wherein two ribs of the plurality of ribs are pivotably attached to the first and second ends of the middle post, and remaining ribs are sequentially pivotably attached to the two ribs.

6. The drone capture aerial vehicle of claim 5, wherein the plurality of links are pivotably attached to the plurality of the ribs, and the plurality of links and the plurality of the ribs form a plurality of quadric link structures.

7. The drone capture aerial vehicle of claim 5, wherein the plurality of links and the plurality of the ribs form a plurality of scissor arms.

8. The drone capture aerial vehicle of claim 1, wherein the drone capture device includes a foldable capture net, and ends of the foldable capturing net are attached to distal ends of the plurality of the foldable frame arms.

9. The drone capture aerial vehicle of claim 8, wherein the drone capture device includes a chamber housing, and the foldable capture net is folded in the chamber housing before being deployed.

10. The drone capture aerial vehicle of claim 8, wherein the drone capture device includes a deploying reel, a center of the foldable capture net is attached to the deploying reel, and the foldable capture net is coiled on the deploying reel.

11. The drone capture aerial vehicle of claim 10, wherein the foldable capturing net includes frame threads, spiral threads, radius threads, and auxiliary radius threads.

12. The drone capture aerial vehicle of claim 1 further comprising:
   a plurality of deploying attach points that are located on the middle post;
   a plurality of guiding rings that are attached onto each foldable frame arm;
   a plurality of end deploying reels that are attached to an end of each foldable frame arm; and
   threads,
   wherein the threads connect the deploying attach points, the plurality of guiding rings, and the plurality of end deploy reels in a zigzag fashion; and the threads slide through the guiding rings.

13. The drone capture aerial vehicle of claim 1, wherein the drone capture aerial vehicle includes a multi-rotor configuration, a helicopter configuration, or a fixed wing airplane configuration.

14. The drone capture aerial vehicle of claim 6, wherein in the plurality of quadric link structures, a movement of the first end of the middle post towards the second end of the middle post causes the plurality of ribs and the plurality of links to stretch outwards from the middle post; and a movement of the first end of the middle post away from the second end of the middle post causes the plurality of ribs and the plurality of links to fold to positions substantially parallel and juxtapositionally close to the middle post.

15. A method of capturing a drone comprising:
   providing a drone capture aerial vehicle, the drone capture aerial vehicle having a drone capture device and the drone capture device having a foldable capture net;
   flying the drone capture aerial vehicle toward the drone;

activating the drone capture device to deploy the foldable capture net; and capturing the drone with the capture net, wherein the drone capture aerial vehicle further includes a fuselage, the drone capture device includes a middle post and a plurality of foldable frame arms; the middle post includes a first end and a second end; and each foldable frame arm includes a plurality of ribs and a plurality of links.

16. The method of claim 15, wherein ends of the foldable capturing net are attached to distal ends of the plurality of the foldable frame arms.

17. The method of claim 16, wherein the drone capture device includes a chamber housing, and the foldable capture net is folded in the chamber housing before being deployed.

18. The method of claim 16, wherein the drone capture device includes a deploying reel, a center of the foldable capture net is attached to the deploying reel, and the foldable capture net is coiled on the deploying reel.

19. The method of claim 15, wherein drone capture aerial vehicle further comprises:
- a plurality of deploying attach points that are located on the middle post;
- a plurality of guiding rings that are attached onto each foldable frame arm;
- a plurality of end deploying reels that are attached to an end of each foldable frame arm; and
- threads,
- wherein the threads connect the deploying attach points, the plurality of guiding rings, and the plurality of end deploy reels in a zigzag fashion; and the threads slide through the guiding rings.

* * * * *